Sept. 29, 1953 R. A. BRODING 2,654,064
ELECTRICAL RESISTIVITY LOGGING OF MUD INVADED FORMATIONS
Filed Aug. 28, 1950 3 Sheets-Sheet 1

Robert A. Broding
INVENTOR.

BY D. Carl Richards
AGENT

Robert A. Broding
INVENTOR.

Patented Sept. 29, 1953

2,654,064

UNITED STATES PATENT OFFICE 2,654,064

ELECTRICAL RESISTIVITY LOGGING OF MUD INVADED FORMATIONS

Robert A. Broding, Dallas, Tex., assignor, by mesne assignments, to Socony-Vacuum Oil Company, Incorporated, New York, N. Y., a corporation of New York Application August 28, 1950, Serial No. 181,817

6 Claims. (Cl. 324—10)

This invention relates to electrical well logging and, more particularly, to the measurement of the resistivity of the media adjacent a well bore.

Electrical well logging is a technique for examining rocks penetrated by a well bore. In U. S. Patents Nos. 1,819,923 and 1,894,328, both issued to Conrad Schlumberger, methods and apparatus for measuring formation resistivities are disclosed. In applying the above Schlumberger methods to the logging of holes drilled with rotary drills utilizing drilling muds, it has been found that the apparent resistivities of formations adjacent the hole are dependent not only upon the true resistivity but also upon other factors, among which are the extent of the invasion of the drilling mud into the formation and the resistivity of the mud. It is, of course, desirable to obtain information relating to the extent of invasion of the mud and to measure formation resistivity independently of mud invasion.

It has been the practice to obtain a first log by making measurements of resistivity at a point close to an input or current electrode as it is moved along the length of a well bore and then to obtain other logs by measurement of the resistivity at one or two other points spaced greater distances from the current electrode in order to give an interpreter an indication of the extent of mud invasion better to determine the true resistivity of the formations. A general analysis of the problem together with curves drawn from numerous tests form the subject matter of the recent booklet, "Resistivity Departure Curves," published by Schlumberger Well Surveying Corp., 1949.

It is an object of the present invention to produce a log in which the extent of the mud invasion will be graphically plotted.

It is a further object of this invention to produce a record having depth along its length and the magnitude of a measurable variable recorded at different distances from one margin, the latter distance being proportional to the effective distance from the bore hole of measurement of the measurable variable as representative of the apparent resistivity at a specific depth in and distance away from the bore hole.

In accordance with the present invention, the spacing between a potential and a current electrode movably positioned in a well bore is continuously varied. A potential detected by potential electrodes is utilized to produce a recordable effect at the earth's surface. The situs for recording the effect on a data receiving element is controlled in a first direction by the depth of one of the electrodes in the well bore and, in a second direction, by the spacing between the electrodes to produce a record of three variables; i. e., depth, spacing and potential.

For further objects and advantages of the present invention, reference may now be had to the following description taken in conjunction with the accompanying drawings in which.

Figure 1:
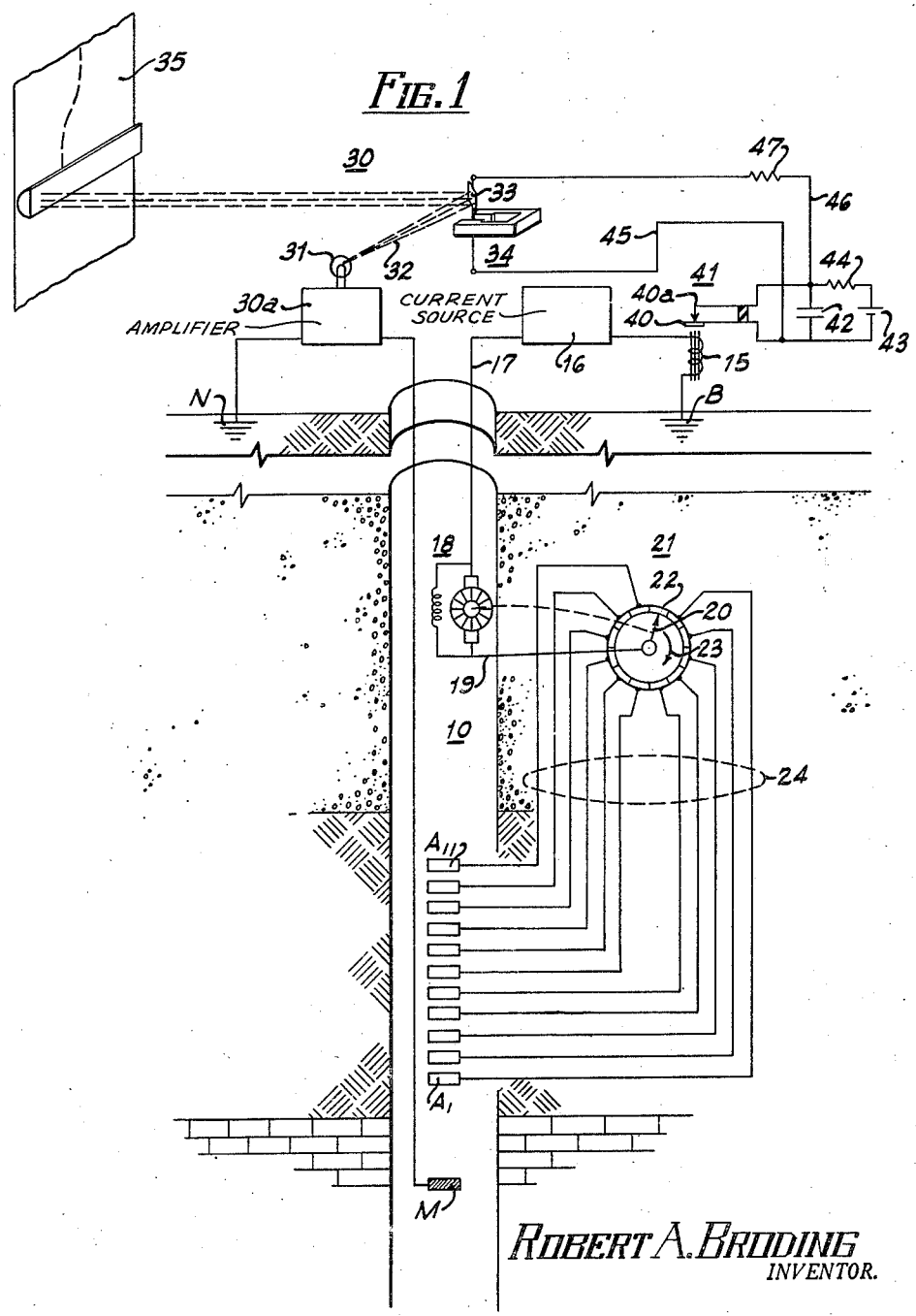
Fig. 1 is a schematic diagram illustrating one embodiment of the present invention.

Referring now to Fig. 1, there is illustrated a well logging system which includes a first current electrode $A_1$, a second current electrode B and two potential electrodes M and N. Current electrode $A_1$ is movably positioned in the bore hole 10 and the current electrode B is grounded at the surface. Potential electrode M is supported for movement in the bore hole 10 along with the current electrode $A_1$ at a fixed distance therefrom. The second potential electrode N is grounded at the surface.

Figure 2:
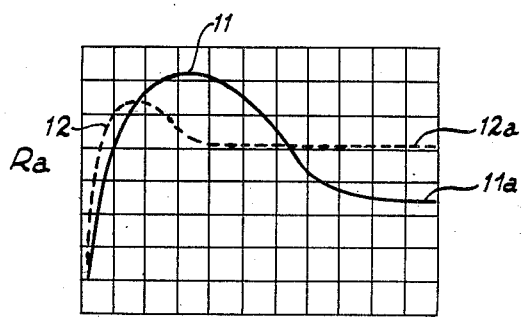
Fig. 2 is a graph of apparent resistivities as a function of distance between a current and a potential electrode in a bore hole for two conditions of mud invasion.

Customarily a log of the well 10 is produced by causing a current of constant magnitude to flow between electrodes $A_1$ and B while moving electrodes $A_1$ and M from the bottom to the top of the bore hole. Current flow between electrode $A_1$ and electrode B establishes a potential field in the vicinity of the electrodes wherein the potential gradient in that field as affected by the earth formations may be measured or probed by the electrodes M and N. The spacing between electrodes $A_1$ and M determines the depth of effective measurement of the formation resistivity. The electrode spacing may materially affect the magnitude of the potential between electrodes M and N where the formations are invaded by muds, particularly those having a resistivity that is different from formation resistivity. Obviously, if the bore hole is filled with liquid, penetration into the formations by mud or liquid of different resistivity than that of the formations will cause the apparent resistivity as measured by the potential electrodes M and N to be different than it would be if there were no such invasion or if the mud resistivity were equal to the formation resistivity. For example, it has been found that if the spacing between electrodes A and M is varied, the apparent resistivity $R_a$ for a given location of the electrodes A and M in the formation will also vary. In Fig. 2 a graph is shown which represents the apparent resistivity $R_a$ obtained in one mud invaded zone for different values of spacings between the electrodes A and M. In Fig. 2 the abscissae are electrode spacings and the values of apparent resistivity $R_a$ are plotted as ordinates. The apparent resistivity curve 11 rises from a low value for very small spacings A—M to a high value for intermediate spacings A—M and then decreases until it reaches a steady and uniform value for very large spacings of A—M. The true resistivity of the formation may be represented by and is proportional to the ordinate at any point taken on the flat portion 11a of the curve 11.

At a different location in the same bore hole, an entirely different curve of apparent resistivity will be obtained in a zone having considerably less invasion of mud. Such a curve has been plotted as the dotted curve 12 of Fig. 2. It will be noted that the maximum value of apparent resistivity is obtained at very much shorter spacings between the electrodes A and M than was obtained in a more permeable mud invaded zone as illustrated by the curve 11. Also, the formation resistivity, as represented by the flat portion 12a of curve 12, is higher than the corresponding portion 11a of curve 11. Curves of the variation of apparent resistivity as a function of electrode spacing may, of course, have different shapes than shown in Fig. 2. The variation depends upon the ratio of resistivities of the formation and the invading mud and the extent of penetration. The curves of Fig. 2 represent two degrees of penetration of formations whose resistivities are lower than that of the invading mud. In another case where a high resistivity formation is invaded by muds of lower resistivity, the curve would exhibit a minimum before reaching a maximum plateau value. In either case, the plateau value is of particular interest as well as the extent or distance of penetration of the muds into the formations.

By the present invention, there is produced a record which graphically displays the extent of mud invasion as a function of depth in a bore hole. More specifically, referring again to Fig. 1, the current electrode B is connected by way of a relay coil 15 to a constant current source 16. A circuit extends from source 16 by way of a conductor 17, a D. C. motor 18 and thence by way a conductor 19 to a brush 20 associated with a multi-segment commutator 21. In the form illustrated, the commutator 21 has twelve insulated segments, eleven of which are connected by way of a multi-conductor cable 24 (indicated dotted) to a series of current electrodes $A_1$–$A_{11}$, only two of which have been given reference characters. The electrodes $A_1$–$A_{11}$ are arranged or disposed one above the other at different selected and predetermined distances from the potential electrode M. The electrodes $A_1$–$A_{11}$ are connected to the segments of the commutator 21 in an ordered sequence that is related to and determined by the spacing of each of the electrodes from the potential electrode M. The twelfth segment, the segment 22, is floating electrically and, as will hereinafter be more fully explained, provides a reference for the operation of surface equipment for the proper recording of potentials detected between the electrodes M and N. The armature of the motor 18, connected electrically in series with the commutator, mechanically drives the brush 20 in the direction indicated by the arrow 23 to complete closed current paths from the source 16 successively through each of the electrodes $A_1$–$A_{11}$. The armature of motor 18, a rotating mass possessing inertia, will maintain momentum, once started, even though during the interval the brush 20 is in contact with the commutator segment 22 no current flows through the motor. Before the exploring system is lowered into the bore hole, the voltage from source 16 is applied to the exploring unit. In case the commutator device is then at rest following prior motion with brush 20 in contact with segment 22 the motor 18 will not start without independently rotating the armature. In this event suitable means, not shown, may be provided for rotating the commutator to such position as to energize the motor. Once it is assured that the motor 18 is energized, the device may then be lowered into the well bore. For each revolution of the armature 20 of the commutator 21, the effective spacing between the current electrode A and the potential electrode M is varied from the relatively close spacing $A_1$—M to the greater spacing $A_{11}$—M. Thus as current flows from the source 16 through the motor 18, commutator 21 and then from electrodes $A_1$–$A_{11}$ to the grounded electrode B there is a continuously repeated cycle of electrode spacings, the variation in electrode spacings being effective to produce a potential field in the vicinity of the potential electrode M that varies in a manner dependent upon the formation resistivity and upon the extent of invasion of the mud into the formations. The electrodes M and $A_1$–$A_{11}$ may be mounted on an elongated housing and the motor 18 and the commutator 21 mounted within the housing (not shown in Fig. 1). If the unit is then moved through a bore hole from bottom to top thereof, there will be detected a repeated series of potentials which for each position of the moving system including the electrodes will be affected by the presence of drilling muds and other foreign fluids in the formation.

In order to utilize the potential variations thus detected, a surface recording system 30 is energized by the potentials appearing between the electrodes M and N. Amplification is provided to convert the potentials into a current whose intensity varies cyclically with the detected potentials. In one form of the invention, the current may be applied after suitable amplification as in amplifier 30a to energize a filament 31 whereupon a beam of light is produced, the intensity of which varies directly with the potential variations detected. The beam of light 32 may be produced directly from the detected potential or may be merely modulated thereby. Light from the filament 31 is then directed onto a mirror 33 carried by a galvanometer 34 and is reflected therefrom onto a moving photographic film 35. The film 35 is driven by suitable rollers or other means preferably in synchronism with the means which positions the electrodes M and $A_1$–$A_{11}$ in the bore hole so that the film length is directly proportional to the bore hole depth. Such means are well known and commonly used in the logging art and may take the form of a Selsyn transmitter and receiver (not shown), the transmitter being driven by a pulley over which the bore hole cables are lowered. The output of the Selsyn transmitter may be connected to the Selsyn receiver mechanically connected to driving rollers for the film 35. Further, the film may be provided with a marker at intervals related to the depth of the bore hole to facilitate the interpretation of any record thus produced.

In the system thus far described, there will be produced on the film 35 a stationary spot of light which will produce a line along the length of the film as the film moves past the spot which varies in intensity in repeated cycles synchronized with the rotation of the commutating device 21. In Fig. 2, the variable amplitude graph, including curves 11 and 12, represents the foregoing variations in intensity. The intensity may vary as the function illustrated by curve 11 or in a different manner such as illustrated by curve 12 or it may vary as a function different from either curves 11 or 12, depending upon the apparent resistivity $R_a$ or the signal detected by the electrodes M and N. If the medium adjacent the electrode system is homogeneous as far as true resistivity is concerned but for some reason is invaded more in one zone than in another, the variation in light intensity corresponding with variations in the apparent resistivity as plotted in Fig. 2 will be obtained. Actually, however, the apparent resistivity measured between the electrodes M and N will depend upon the combination of the true resistivity and the effect on the true resistivity of the invaded muds.

In order to produce a graphic representation of mud invasion, applicant provides means for sweeping the above-noted spot of light laterally across the film 35 in synchronism with the commutator 21. When the brush 20 is in contact with the floating segment 22 of the commutator 21, flow of current from the source 16 is momentarily interrupted. This interruption of current flow is utilized to initiate the actuation of the means for sweeping the spot of light across the film 35. More particularly, the interruption of current flow releases the armature 40 of a relay 41 to permit it to occupy a normally closed position completing a circuit for discharge of a condenser 42 during the interval that the brush 20 is in contact with segment 22. When current flows from source 16, the armature 40 is pulled away from its cooperating contact 40a to open the condenser discharge circuit whereupon condenser 42 is charged from battery 43 through a resistor 44. The charging rate for condenser 42 is dependent upon the size of the condenser and upon the magnitude of resistor 44. Preferably, the circuit including condenser 42, battery 43 and resistor 44 is designed so that the voltage appearing across condenser 42 will increase at a substantially uniform rate during the time interval required for one revolution of the commutator brush 20. It is to be understood that this portion of the circuit of Fig. 1 is representative only of many systems for producing a saw-tooth voltage in response to an initiating pulse. The voltage appearing across condenser 42 is applied to the coil of the galvanometer 34 by way of conductors 45 and 46 and resistor 47. The flow of minute currents from condenser 42 are thereby utilized to deflect the galvanometer from the left-hand margin of the film 35 to the right-hand margin thereof at a uniform rate and in synchronism with the travel of the brush 20 around the various segments of the commutator 21. Relatively rapid return of the spot to the left-hand margin takes place in the interval the brush 20 is in contact with the floating segment 22. Thus, the otherwise stationary spot of varying intensity is swept laterally across the film 35 producing a trace of variable intensity that corresponds with the apparent resistivity in a particular point in the bore hole.

Figure 3:
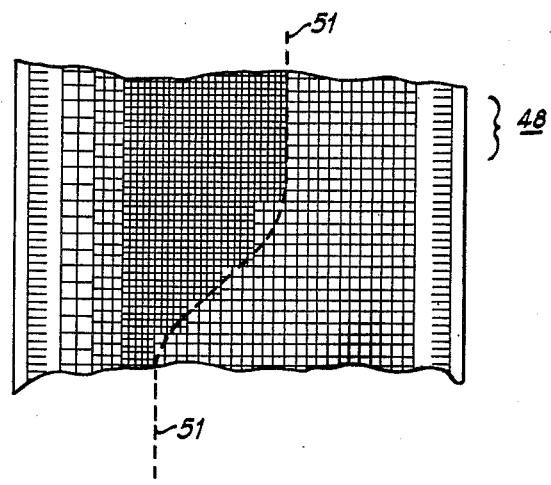
Fig. 3 is a view of a variable density record corresponding with and representative of the resistivities plotted in Fig. 2.

Short sections of a draftsman's representation of a record of a section of bore hole characterized by two conditions of mud invasion in formations of different resistivity are shown in Fig. 3 and correspond with the curves 11 and 12 of Fig. 2. Records actually produced in accordance with the present invention are characterized by gradations in opacity laterally and longitudinally of the record. Such gradations have been represented in Fig. 3 by areas cross-hatched with different line spacings, the smaller spacings corresponding to greater opacity whereas the larger cross-hatch sections represent greater transparencies. The portion of Fig. 3 indicated by the reference character 48 corresponds with curve 11 of Fig. 2 and the portion of the record of Fig. 3 indicated by the reference character 49 corresponds with curve 12 of Fig. 2.

With the film 35 driven in synchronism with the electrode system as it moves from the bottom to the top of a bore hole, there is recorded a display on the film 35 that is directly indicative of the extent of the mud invasion along the length of the bore hole. That is, by merely noting the point on the right-hand side of a record such as illustrated in Fig. 3 beyond which the density of the film is constant, one may determine the extent of mud invasion at a given depth. In Fig. 3 the extent of mud invasion has been indicated by the dotted line 51. At distances corresponding to electrode spacings for points on Fig. 3 to the left of line 51 the formation resistivity may be said to be affected by mud invasion. To the right of line 51, the invasion of the mud is negligible in extent. Thus, the variations in the dotted line may be said to be a plot of formation permeability. Further, the density of the record at any point to the right of the dotted line 51 may be taken as representative of true formation resistivity as seen by a system having an electrode spacing corresponding with the point on the record of Fig. 3 at which the film density is measured.

It will be apparent that if variations longitudinally of the record to the right of line 51 are to be taken as indicative of variations in formation resistivity, the logging instrument must be moved through the bore hole at constant speed, thus to produce a constant speed film drive. If the film speed is constant, then variations longitudinally of the record to the right of line 51 will depend only upon the true resistivity of the formations independent of mud invasion. In Fig. 3 the upper section 48 of the record to the right of the line 51 is comparatively lightly shaded. This means that the potential detected between electrodes M and N was relatively low, thus producing a beam of light of a relatively low brilliance. In contrast therewith, the heavily shaded section in the lower portion 49 of Fig. 3 to the right of line 51 may be taken as representative of the true resistivity in an area where the resistivity is relatively high. Thus, not only is there produced a graphic representation of mud invasion, but also a representation of variations in true formation resistivities.

Figure 4:
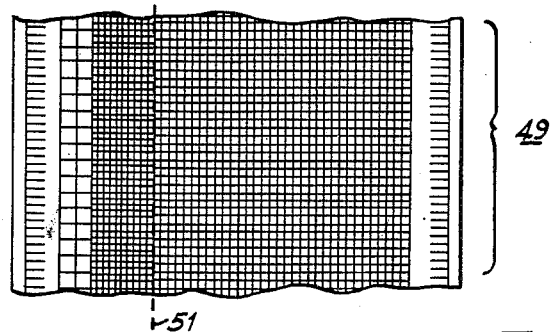
Fig. 4 is a view of a well logging tool embodying the present invention.
Figure 4:
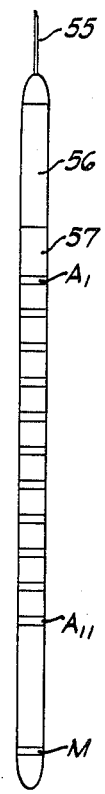

In Fig. 4 there is illustrated the one form of an exploring instrument for housing the down hole portion of the circuit of Fig. 1. A cable 55 leading from the instrument to the surface preferably will contain a strain member for supporting the instrument in the bore hole adjacent the formations to be logged and at least a pair of conductors for connecting the "A" electrodes to the electrode B and for connecting the electrode M to the electrode N. A chamber 56 may be utilized to house the commutator 21 and its driving motor 18. An insulated section 57 mechanically coupled to the housing 56 preferably will carry the current electrodes $A_1$–$A_{11}$ and the potential electrode M. The spacings between the electrode M and the various electrodes $A_1$–$A_{11}$ may be selected to meet the requirements in any particular area. In an area where invasion of muds is restricted to short distances, it will be apparent that a shorter overall spread from the electrode M to the electrode $A_{11}$ would be required than in other areas in order to obtain measurements of formation resistivity beyond the mud invaded section.

The foregoing illustrates the present invention as applied to what is commonly termed a two electrode logging system which is generically illustrated by the aforementioned Schlumberger Patent No. 1,894,328. In this system, two electrodes are grounded at the surface of the earth and two electrodes are moved through the bore hole. It will be apparent that the system may be modified as to be utilized with the three and four electrode systems. Further, in accordance with four electrode techniques, very short spacings are used to obtain detailed information relating to the formations very close to the well bore, and particularly the mud cake that lines the well bore. Such technique, ordinarily termed "micrologging," may be employed in accordance with the present invention. The electrode spacings may be made very short and varied as above described to obtain a detailed log of formations very close to the bore hole.

Figure 5:
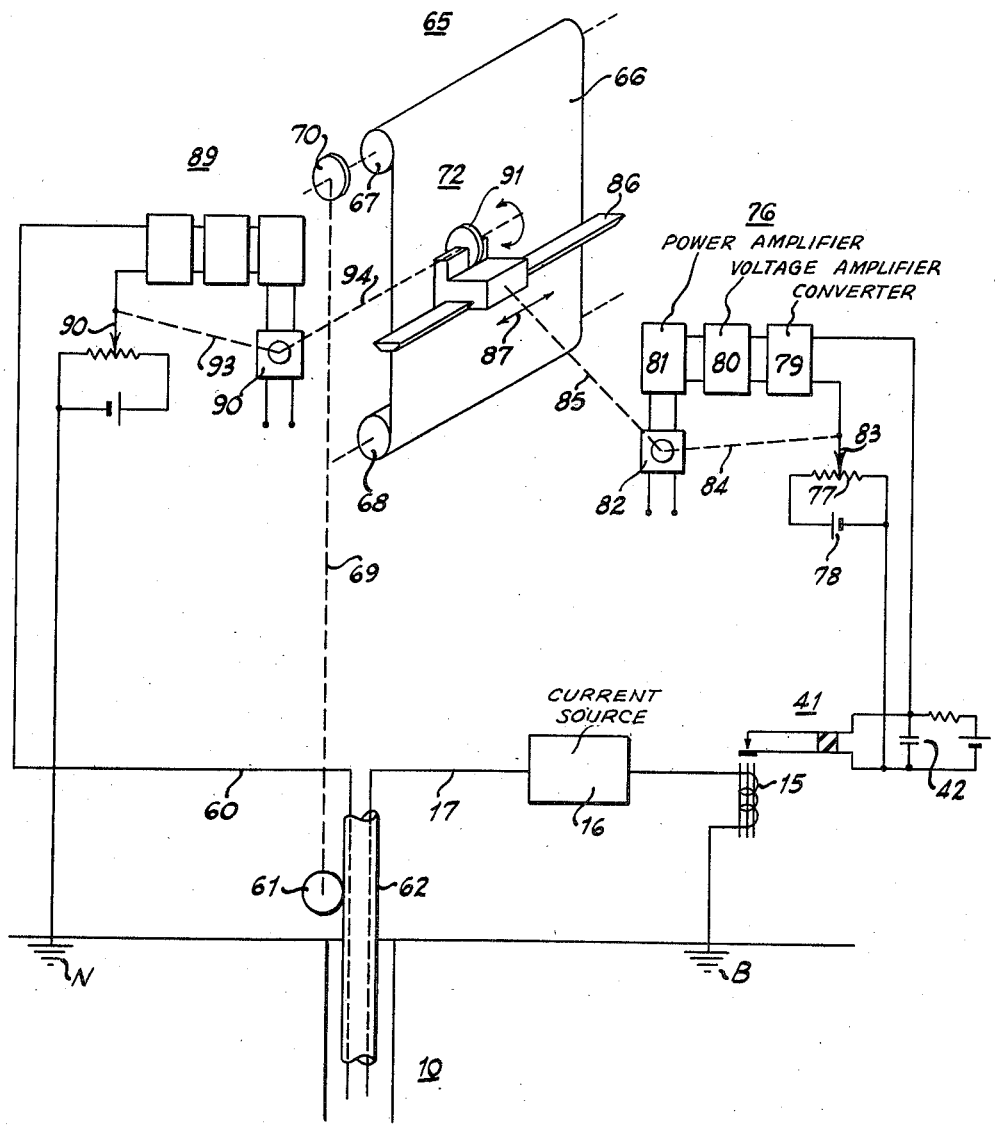
Fig. 5 is a view of one modification of the invention.

While the system of Fig. 1 includes a specific form of commutating device and a specific recording system, they are given by way of illustration only for in general other systems may be used to vary the electrode spacing and systems capable of producing a record showing three variables may be utilized for producing the desired record. For example, a suitable recording system is illustrated in Fig. 5 wherein the elements located in the hole 10 have been omitted and only the surface elements shown. Where consistent, parts have been given the same reference characters as in Fig. 1. In this system, closure of the relay 41 upon interruption of current flowing from the source 16 discharges the condenser 42 as was discussed in connection with Fig. 1. The condenser 42 is charged from the series connected battery as described in connection with Fig. 1 so that the voltage thereacross varies substantially linearly with time and depends for a frequency characteristic upon the action of a suitable commutator device located down hole. Similarly, as in the case of the system of Fig. 1, the voltage appearing between the output conductor 60 terminated at the down hole potential electrode M and the surface electrode N varies in a manner depending upon the electric field in which the electrode M is positioned. In this system, three variables are recorded, i. e., depth as sensed by a pulley 61 under control of the cable 62, the electrode spacing as converted into a linearly varying or saw-tooth voltage across condenser 42 and a potential between the conductor 60 and electrode N.

The recorder 65 basically may be one of the conventional strip recorders such as are commonly commercially available. Such recorders are generally discussed under the heading, "Electronic Recording Instruments" in Electrical Engineering, January, 1947, pages 36 to 44. In such systems a chart is driven past a recording point in a controlled manner and a recording instrument is positioned laterally on the chart in response to a variable function. The recorder may include a chart 66 driven over rolls 67 and 68, the roll 67 being mechanically rotated to move the recording chart 66 by way of a coupling 69 (indicated as a dotted line) between the pulley 61 and a pulley 70 mounted on the shaft or otherwise connected to the roller 67. When coupled in a manner well understood in the logging art, variations in depth of the electrodes associated with cable 62 are converted to a proportional movement of the record chart 66 so that the length of the chart 66 corresponds with depth of the electrodes.

A recording head 72 associated with the recorder 65 may be controlled in its lateral position with respect to the length of the chart 66 by an electromechanical sensing system 76. The sensing system may be a continuously balance-seeking potentiometer of the type utilized in strip recorders such as Brown Instrument Company's "Electronik" Recording Potentiometer or the Leeds and Northrup Instrument Company's "Speedomax" type G recorder. In general, such a sensing system includes a potentiometer 77 across which there is provided a voltage from a battery 78. A portion of the voltage across the potentiometer 77 is connected in series with the voltage to be measured, i. e., in this case the variable voltage across condenser 42. The voltages in series are effective on the input of converter 79 which changes the difference between the voltage across the potentiometer 77 and the voltage across the condenser 42 into an alternating potential that may be readily amplified. A voltage amplifier 80 and a power amplifier 81 are connected between the converter 79 and a reversible balancing motor 82. The balancing motor controls the position of the tap 83 on the potentiometer 77 by a coupling 84 (shown dotted). Generally the coupling also extends to and controls the position of the recording head 72. This coupling, as indicated by the dotted line 85, positions the recording head along a guide generically represented by the dove-tailed slideway 86 in directions indicated by the arrow 87, its position depending upon the magnitude of the voltage across the condenser 42. The system has been shown in block diagram, since the principles are generally understood by those skilled in the art. In operation when the voltage across condenser 42 is low, the recording head 72 will be positioned in the left margin of the chart 66. In response to maximum voltages across condenser 42, the motor 82 drives the recording head 72 to the right-hand margin of the chart 66. Thus, in accordance with the foregoing description, depth of the electrodes in the bore hole 10 controls longitudinal movement of the chart 66 and the voltage across condenser 42 controls the lateral position of the recording head 72 with respect to the chart 66.

The magnitude of the potential between conductor 60 and the electrode N is then recorded at a situs on the chart 66 which is controlled by the foregoing two variables. The magnitude of the potential may be converted into motion by means of a sensing system 89 which includes a converter-amplifier system corresponding to the elements 79–81 above described in connection with the sensing system 76. The balance motor 90 of the sensing system 89 controls the position of the slide wire tap 90 and also controls the rotational position of a printing wheel 91 carried by the recording head 72. The coupling 93 from motor 90 is linear whereas the coupling 94 is rotational. Devices such as the printing wheel 91, available as an integral part of commercial strip chart recorders, has on its periphery a series of numbers selectively positioned, by rotation of the shaft or coupling 94, for contact with the chart 66. The magnitude of the apparent resistivity is thus printed on the chart 66, in accordance with the foregoing description, at a situs dependent in one positional relation by the hole depth and in another positional relation by the electrode spacing.

The motor driven commutator 21 has been illustrated generically to represent devices which in general may be utilized to place each of the electrodes $A_1$–$A_{11}$ in circuit with a current source such as the source 16. It will be recognized that other devices could be used in place of the system specifically illustrated in Fig. 1. Further, the selection of the situs for recording the magnitude of the potential detected between electrodes M and N may be controlled by means other than the combination of condenser 42 and battery 43. In general, systems capable of varying in a first direction the positional relation between the potential translating and/or registering means and the record in proportion to variations in the depth of the electrodes and for varying in a second direction the positional relation between the translating and/or registering means and the record or chart to correspond with variations in the spacings between A and M electrodes may be utilized.

Though the invention has been illustrated by several modifications thereof, it is to be understood that further modifications within the scope of the appended claims may now suggest themselves to those skilled in the art.

What is claimed is:

1. In an electrical well logging system wherein means including a current electrode and a potential detector respectively establish an electric field by current flow at a first point in a well bore and probe said electric field at a second point and wherein said electrode and detector are supported for movement along said well bore to vary the depth of said points for producing on a record element a plot of the electrical character of earth formations, the combination which comprises means for varying the spacing of said points between two different values, means including translating and registering means connected to said potential electrode for producing a scalar output having a magnitude dependent upon said electric field and said spacing, means for adjusting the position of said registering means along a first dimension of said record element in proportion to the depth of said points in said well bore, and means for adjusting the position of said registering means along a second dimension of said record element in proportion to the value of said spacing between said points for registering said scalar output at a situs on said element dependent upon said depth and said spacing.

2. In an electrical well logging system wherein means including a current electrode and a potential electrode respectively establish an electric field by current flow at a first point in a well bore and probe said electric field at a second point and wherein said electrodes are supported for movement along said well bore to vary the location of said points for producing on a record element a plot of the electrical character of earth formations, the combination which comprises means for cyclically varying the spacing between said points from a predetermined minimum to a predetermined maximum, means including translating means connected to said potential electrode for producing a scalar output which varies in accordance with said electric field as said spacing and the position of said points are varied, means for varying in a first direction the positional relation between said translating means and said record element to correspond with variations in the position of said points in said well bore, and means for varying in a second direction the positional relation between said translating means and said record element to correspond with variations in said spacing for registering said scalar output at a situs on said element dependent upon said position and said spacing.

3. In an electrical well logging system wherein means including an exploring unit having a current circuit and a potential circuit respectively establish an electric field by current flow at a first point in a well bore and probe said electric field at a second point and wherein said exploring unit is supported for movement along said well bore to vary the location of said points for producing on a record element a plot of the electrical character of earth formations, the combination which comprises a plurality of electrodes mounted on said exploring unit and spaced apart in the direction of the length of said bore hole, means for cyclically closing the current flow path of said current circuit through each of said plurality of electrodes in an ordered sequence for cyclically varying the spacing between said points from a minimum to a maximum, means including translating means connected to said potential circuit for producing a scalar output which varies in accordance with variations in said electric field as said spacing and the position of said points are varied, means for varying in a first direction the positional relation between said translating means and said record element to correspond with variations in the position of said points in said well bore, and means for varying in a second direction the positional relation between said translating means and said record element to correspond with variations in said spacing for registering said scalar output at a situs on said element dependent upon said position and said spacing.

4. In an electrical well logging system wherein means including an exploring unit having a potential detector and a circuit including a current source respectively detect potentials at a first point and establish an electric potential field by current flow at a second point in a well bore and wherein said exploring unit is supported for movement along said well bore to vary the depth of said points for producing on a record element a plot of the electrical character of the formations, the combination which comprises a plurality of current electrodes spaced apart along the length of said exploring unit and supported thereby, a multiterminal switch carried by said exploring unit and connected between said source and said current electrodes, a motor mechanically coupled to said switch for driving said switch cyclically to complete said current circuit to each of said current electrodes to produce a cyclically varying electric field adjacent said potential detector upon flow of current from said electrodes, means including registering means connected to said potential detector for producing a scalar output which varies in proportion to said variations in said varying electric field, means for varying the position of said registering means along a first dimension of said record element in dependence upon variations in the depth of said points in said well bore, and means for varying the position of said registering means along a second dimension of said record element cyclically in dependence upon the cyclic completion of said current circuit through said switching means for recording said scalar output at a situs on said element dependent upon said depth and upon said spacing.

5. In an electrical well logging system utilizing means including an exploring unit connected to a source of direct current for establishing an electric field by current flow at a first point in a well bore and a potential detector for probing said field at a second point to determine variations in the apparent resistivity of the formations adjacent thereto, the combination therewith which comprises a plurality of electrodes spaced different distances along the length of said well bore from said potential detector and supported by said exploring unit, switching means for repeatedly completing a current flow path from said source of direct current through each of said electrodes to produce a cyclically varying electric field due to current flow in adjacent formations thereby to produce a cyclically varying voltage at said potential detector, a circuit means connected to said potential detector and including means for translating said varying voltage to a beam of variable intensity light, means for varying the position of said beam of light in a first dimension in synchronism with and in dependence upon said ordered sequence, and means for driving a light sensitive film along a direction normal to said first dimension and in the field of said beam of light in dependence upon variations in the depth of said exploring unit for exposing said film at a situs dependent upon said depth and said ordered sequence.

6. In an electrical well logging system utilizing means including an exploring unit connected to a source of direct current for establishing an electric field by current flow at a first point in a well bore and a potential detector for probing said field at a second point to determine variations in the apparent resistivity of the formations adjacent thereto, the combination therewith which comprises a plurality of electrodes spaced different distances along the length of said well bore from said potential detector and supported by said exploring unit, switching means for repeatedly completing a current flow path from said source of direct current through each of said electrodes to produce a cyclically varying electric field due to current flow in adjacent formations thereby to produce a cyclically varying voltage at said potential detector, means including a circuit connected to said potential detector and also including a print wheel device for translating said varying voltage into a registerable number proportional to the magnitude of said varying voltage, means for varying the position of said print wheel along a first line in synchronism with and in dependence upon said ordered sequence, and means for driving a data receiving element along a second line normal to said first line and in a cooperative relation with said print wheel in dependence upon variations in the depth of said exploring unit for impressing said number on said element at a situs dependent upon said depth and said order of sequence.

ROBERT A. BRODING.

References Cited in the file of this patent
UNITED STATES PATENTS

| Number | Name | Date |
|---|---|---|
| 2,170,857 | Elliott | Aug. 29, 1939 |
| 2,376,610 | Millington | May 22, 1945 |
| 2,393,009 | Chun | Jan. 15, 1946 |

Disclaimer 2,654,064.—*Robert A. Broding*, Dallas, Tex. ELECTRICAL RESISTIVITY LOGGING OF MUD INVADED FORMATIONS. Patent dated Sept. 29, 1953. Disclaimer filed Sept. 26, 1955, by the assignee, *Socony Mobil Oil Company, Inc.*

Hereby enters this disclaimer to claims 1 and 2 of said patent.
[*Official Gazette October 25, 1955.*]